US00RE37121E

(19) United States
(12) Reissued Patent
Gist

(10) Patent Number: US RE37,121 E
(45) Date of Reissued Patent: Apr. 3, 2001

(54) RECIPROCATING SLAT CONVEYORS

(76) Inventor: Richard T. Gist, 4375 NW St., Tulare, CA (US) 93274

(21) Appl. No.: 09/160,950

(22) Filed: Sep. 25, 1998

Related U.S. Patent Documents

Reissue of:
(64) Patent No.: 5,560,472
Issued: Oct. 1, 1996
Appl. No.: 08/449,026
Filed: May 24, 1995

(51) Int. Cl.[7] ..... B65G 25/04
(52) U.S. Cl. ..... 198/750.3; 198/750.4
(58) Field of Search ..... 198/750.3, 750.4; 414/525.1, 525.9

(56) References Cited

U.S. PATENT DOCUMENTS 4,856,645 * 8/1989 Hallstrom, Jr. ..... 198/750.4
4,858,748 * 8/1989 Foster ..... 198/750.4
4,896,761 * 1/1990 Foster ..... 198/750.3
5,088,595 * 2/1992 Hallstrom, Jr. ..... 198/750.3
5,222,593 * 6/1993 Quaeck ..... 198/750.5
5,267,641 * 12/1993 Hallstrom, Jr. ..... 198/750.3
5,301,798 * 4/1994 Wilkens ..... 198/750.3
5,323,894 * 6/1994 Quaeck ..... 198/750.3
5,325,957 * 7/1994 Wilkens ..... 198/750.2
5,346,056 * 9/1994 Quaeck ..... 198/750.3

* cited by examiner

*Primary Examiner*—Joseph E. Valenza
(74) *Attorney, Agent, or Firm*—Delbert J. Barnard

(57) ABSTRACT

In a [walking floor] *reciprocating slat conveyor* having a plurality of floor beams to support a load, and being longitudinally reciprocal to move the load longitudinally to an unloaded condition, and being supported by a transverse subfloor, having guides to control movement of the floor beams, and bearing/seal devices mounted to the subfloor and in bearing and sealing contact with the floor beams to prevent material that is part of the load supported by the floor beams from migrating below the floor beams.

20 Claims, 2 Drawing Sheets

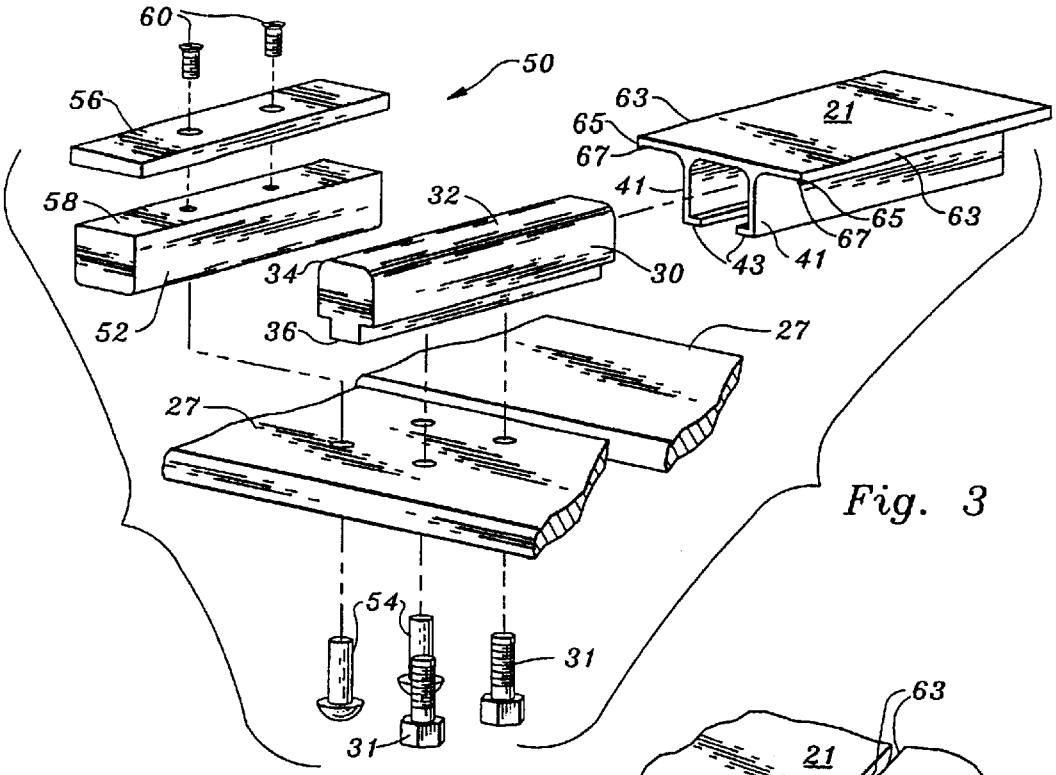
Fig. 3
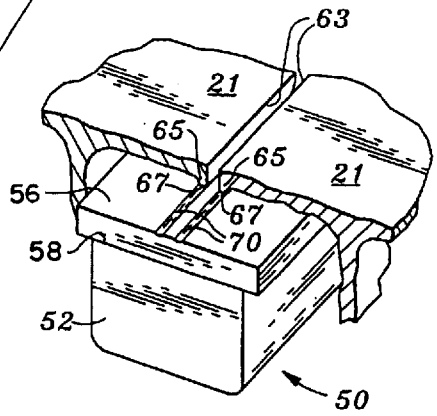
AMENDED Fig. 5
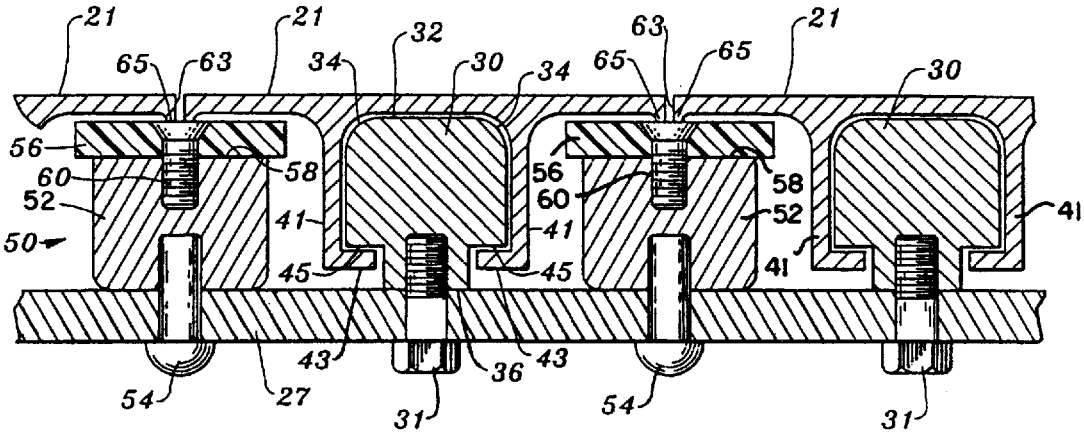
AMENDED Fig. 4

RECIPROCATING SLAT CONVEYORS

Matter enclosed in heavy brackets [ ] appears in the original patent but forms no part of this reissue specification; matter printed in italics indicates the additions made by reissue.

The present invention relates, in a general sense, to [walking floors] *reciprocating slat conveyors* for use in mobile, as well as stationary, applications and more particulary to improvements in the sealing of such [floors] *conveyors* against arbitrary and inadvertent loss of material stored upon and moved by such [floors] *conveyors*.

BACKGROUND OF THE INVENTION

1. Field of the Invention

The storage and transportation of particulate materials such as grains, sawdust, wood chips, feeds, similar powdery materials, and even such materials having a liquid component, has been a matter of industry concern for several years. Materials such as those identified above will be referred to hereinafter simply as particulate materials.

Hoppers, bins and silos are all capable of storage of such materials, but are of limited use in transportation. Moreover, costs incident to the construction of such vessels, which is labor intensive, approaches the prohibitive.

[Walking floors, sometimes referred to as reciprocating] *Reciprocating slat* conveyors, have been found useful in the loading and unloading of more readily available rectangular enclosures wherein difficulty is encountered in using front end loaders, or other similar devices, to accomplish the task of moving particulate material into and out of a storage or transportation facility.

Such systems typically comprise a series of floor members, sometimes referred to as slats, which are disposed in side by side relation to form a flat surface or floor. Each of the floor members is movable fore and aft, either in unison, or in opposition, to move material disposed on the floor in either a fore or aft direction.

Systems of the type to which this invention relates, exhibit several problems which have been the focus of industry wide research since the systems began to enjoy acceptance. A major problem is one of leakage of particulate material through the floor. Such leakage creates problems in two broad areas. First, the material that actually leaks of passes through the floor members may be lost forever to the owner, and the quantity, over a trip of several miles could be measured in tons. Secondly, if the particulate material is not lost entirely, it will most certainly accumulate beneath the floor, and in so doing, pack together, eventually raising the floor, or creating frictional loads of significant magnitude, such that efficient operation of the floor becomes gravely impaired.

Until the advent of the present invention, problems such as those identified continue to diminish the acceptance of walking floor systems, particularly in the transportation industry.

2. Overview of the Prior Art

The type of system for which the present invention has particular utility is illustrated generally in Wilkens U.S. Pat. No. 5,325,957 and Quaeck Pat. 5,222,593. Wilkens is also illustrative of the problem addressed by the present invention. Referring to FIG. 4, *of Wilkens,* the bearing surfaces 90 and 92 are abutting, as illustrated. However, as these surfaces wear, particulate matter will filter down to the space, or pocket, defined between the integral walls 88 and will, if unable to escape, build up and become impacted against the horizontal floor slat retainer surface 80. Eventually the material will apply pressure to the surface 80, causing the slats to skew, increasing resistance to movement, and impairing the ability of the slats to move at all.

A myriad of solutions can be found in the patent art, such as, for example, in Hallstrom, Jr. U.S. Pat. No. 5,267,641, in which a system is disclosed for wiping away accumulated material beneath the slats. The disclosure makes no real pretense, however, of preventing the infiltration of such material in to the guide and bearing area beneath the slats.

Halstrom, Jr. was prolific in this area, however, and in a related U.S. Pat. No. 5,088,595, he employs essentially the same structure to effect a waterproof seal, which is accomplished by a "U" shaped flexible fluid impervious seal, 72, which caps abutting lateral extensions of the base members.

Foster, in his U.S. Pat. Nos. 4,896,761 and 4,858,748, both of which appear to have their beginnings in the same concept, employs a seal strip 38 between adjacent slats to prevent the incursion of particulate beneath the floor. Not unexpectedly, however, that seal wears and must be replaced, at a not insignificant cost.

Wilkens U.S. Pat. No. 5,301,798 discloses vertical bearing surfaces 84, which the inventor states, in column 5, acts as a seal in concert with an adjacent such surface. When wear is suffered by these surfaces, however, replacement rather than repair is the rule.

Quaeck also attempted to address the problem in U.S. Pat. Nos. 5,323,894 and 5,346,056, both of which sprang from the same application, by cutting a slot, or groove, in a side bearing 8. The groove receives flanges 82 formed on the edges of the slats, and, hopefully, prevents the incursion of particulate material beneath the floor. This system, while having some superficial appearance similar to that of the seals of the present invention, is entirely different in the scheme of things, as will appear from a further reading of this specification.

SUMMARY OF THE INVENTION

The invention, which is the subject matter of this specification, comprises a novel seal/bearing arrangement, which effectively prevents the inadvertent passage of particulate material disposed on the floor of a [walking floor or] *reciprocating slat* conveyor system, through the floor members *or slats* and into the area beneath the floor members.

Accordingly, it is a principal objective of the present invention to provide a structure that effectively seals a [moving floor] *reciprocating slat conveyor* from the incursion of particulate material to the area beneath the floor, while coincidently providing a highly effective bearing for minimizing friction on the reciprocatable floor members.

It is another objective of the present invention to provide a novel [walking floor] *reciprocating slat conveyor* which will effectively discharge particulate material that may accumulate beneath the floor members, despite the effectiveness of the sealing system, thereby avoiding the adverse consequences of such accumulation, such as packing of such material.

Yet another objective of the present invention is the provision of a [walking floor] *reciprocating slat conveyor* system that is capable of being cleaned easily and effectively, both above and beneath the flooring, to eliminate contamination of particulate materials, and to preserve and enhance sealing and bearing surfaces.

Another, and still further, objective of the present invention is to provide a [walking floor] *reciprocating slat con-*

*veyor* system in which the seal/bearing arrangement is sufficiently effective that the tolerances between respective parts becomes less significant than in systems currently in use.

A benefit, ancillary to the foregoing objective, is the ability to permit wider horizontal spacing of *the slats or* floor members, resulting in unsurpassed ease of installation, and a lower initial and maintenance cost.

The ability of the present invention to achieve these, and other objectives not specifically enumerated, will become apparent from a reading of the detailed specification in conjunction with the accompanying drawings, wherein:

BRIEF DESCRIPTION OF THE DRAWINGS

FIG. 3, is an exploded view of an assemblage of parts comprising the novel sealing/bearing system of the present invention;

FIG. 4, is a [side elevation] *cross-sectional view* of the [walking floor] *reciprocating slat conveyor* of the present invention, sectioned to further define the working relationship of the floor elements, and particularly the seal/bearing area; and FIG. 5, is an enlarged *perspective* view of the area encircled *by line 5—5* in FIG. [4] *2*, to show the specific seal/bearing area in greater detail*, such view showing fragmentary portions of the floor beams in section.*

DETAILED DESCRIPTION OF A PREFERRED EMBODIMENT

Figure 1:
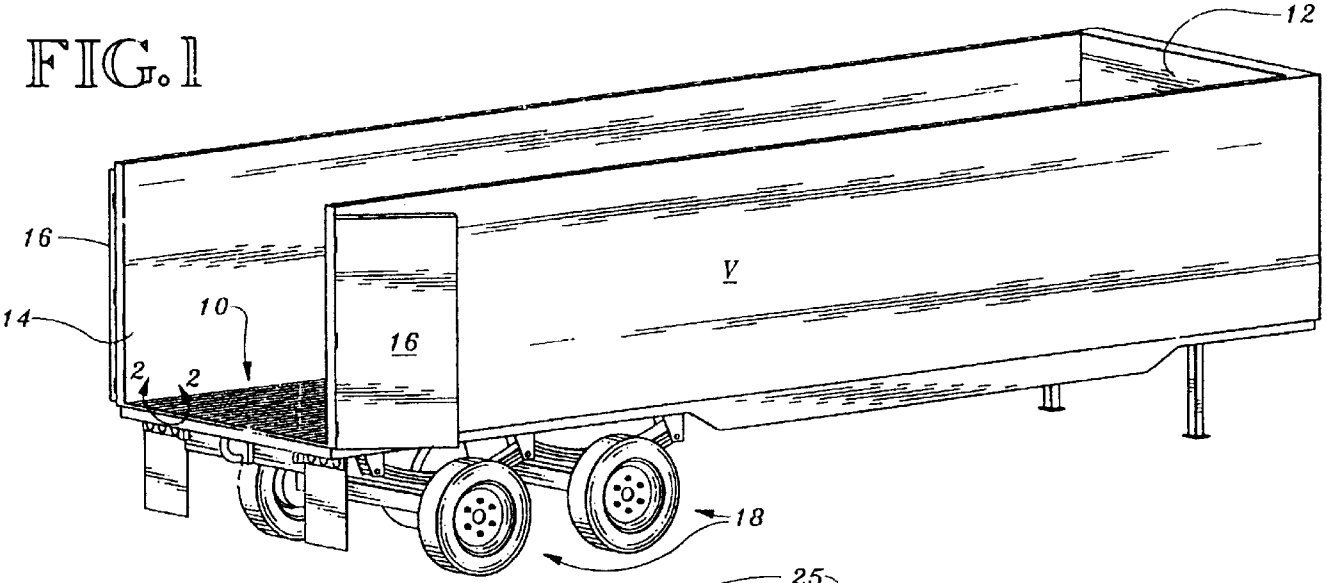
FIG. 1, depicts, in perspective, an overland van with a [walking floor] *reciprocating slat conveyor* system constructed in accordance with the present invention, installed therein, and is illustrative of one environment in which the invention has particular, although not exclusive, use.

With reference now to the drawings, and initially to FIG. 1, a van, V, is illustrated to provide one environment in which the present invention finds particular utility.

The van V, as shown, comprises an open top configuration which permits loading from the top. However, a closed top van, or vans of other configurations familiar to the over-the-road hauler, could be similarly equipped with the moving floor system of the present invention without departure therefrom.

As earlier stated, the floor system of the present invention is equally adaptable to warehouse, or stationary applications, but since the over-the-road application seems to create the most challenging environment for such systems, that environment has been chosen for the following description.

In accordance with the invention, a novel [walking floor] *reciprocating slat conveyor* system 10 is installed in the van V. The floor system 10 is disposed longitudinally within the van in order to unload the van from the forward end 12, toward the rear end 14. The load within the confines of the van is protected from inadvertent discharge by doors 16, illustrated in the open position. The van is supported by rear wheels 18, and is towable by a fifth wheel system (not illustrated) or by any other well known arrangement.

Figure 2:
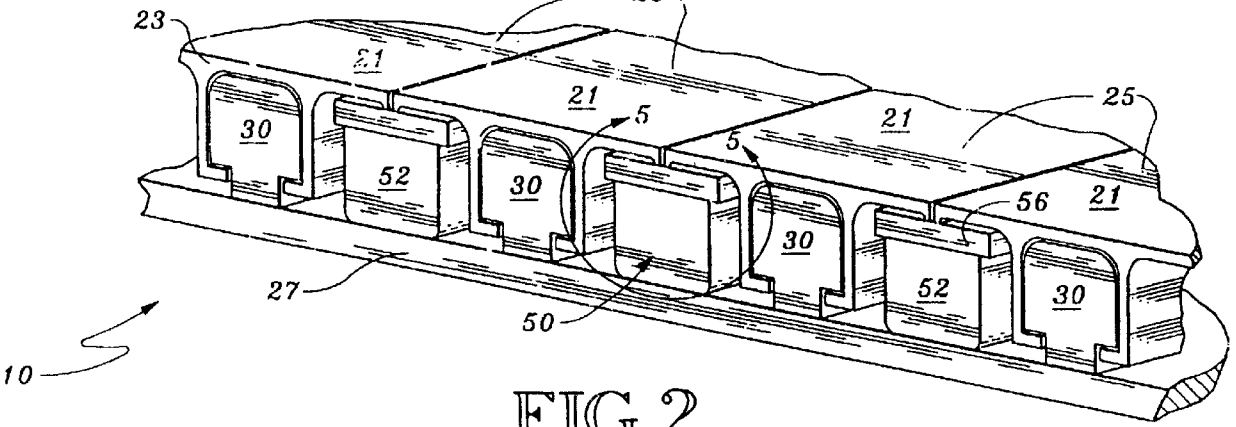
FIG. 2, is a perspective view of a portion of the [walking floor] *reciprocating slat conveyor* system of the present invention, denoted by arrow 2—2 of FIG. 1, illustrating in a more pictorial setting, the interrelationship of the various elements of the system.

The floor system 10 is perhaps best illustrated in FIGS. 2 through 5, and referring to FIG. 2 in particular, there is shown a plurality of reciprocatable floor members, or beams, 21, disposed in parallel relation. Each such floor beam comprises a horizontally disposed plank, or slat, portion 23, having a flat surface defining a load receiving face 25. The face portions of adjacent ones of said beams are coplanar, thereby presenting, in unison, a relatively flat, level surface upon which a particulate, or other load, may be firmly supported.

In order to provide support for the floor beams 21, the invention contemplates the use of a slotted subfloor, comprising a series of spaced support members 27. The support members 27 are supported within the van V by its own frame structure, such that the support members run transverse to the longitudinal axis of the van and are secured to the framework of the van V in spaced relation relative to one another. The support members, in addition to providing necessary and uniform support for the floor beams 21, provide rigidity and support for the van V.

The spacing of the support members 27 is a matter of intelligent choice, dictated to a substantial extent, by the weight to be supported by the support members, including the walking floor 10 and the maximum loads which are contemplated for the van's capacity.

As is the case with competitive [walking floors] *reciprocating slat conveyors*, the floor *slats or* beams are moved fore and aft along the longitudinal axis of the van V. They may be moved in one direction or the other, either in unison or in some alternative pattern, as may be desirable, but in any event, in an well known manner. Since such beams are long in their direction of movement, it is necessary to provide guidance for such movement to avoid misalignment, the inevitable consequence of which is the breakdown of the sealing arrangement and increased friction with coincident increases in wear, just to name a few.

Accordingly, guidance is provided for the floor beams 21 by guide members 30. Each guide member 30 is secured to the support members 27 by means of fasteners 31, which may be of any well known construction or type not inconsistent with the task of holding the guide members 30 securely in alignment.

Each guide member 30 is configured so as to be partially encircled by a floor beam 21. More specifically, and referring in particular to FIG. 4, each guide member 30, comprises an elongated strip, or more accurately, a series of strips joined together at their ends to form a rail upon which the floor beam 21 may reciprocate.

In order to optimize the performance of the guide members 30, they are shaped, in profile, in a substantially rectangular configuration with an upper body portion 32, having arcuate, or rounded, upper corners 34, the upper body portion 32 being supported on a lower body portion or stem 36. The lower body portion is, as seen in FIG. 4, secured to the lower support members 27, by fasteners 31.

Again referring to FIG. 4, and additionally to FIG. 3, each floor beam is formed with a pair of opposed depending "L" shaped legs 41. The "L" shaped legs 41 combine to define a channel beneath the plank portion 23, which channel is dimensioned to embrace the upper body portion 32 of the guide members 30, with inwardly turned flange portions 43, of legs 41 cupped beneath the lower surface 45 to secure the floor beam 21 from raising up from its position on the guide member 30.

In order to provide a minimum lateral or torsional movement, or torquing, of the floor beams during operation, they must fit as closely as possible about the guide members 30. Naturally, the more secure the fit the greater likelihood of frictional resistance to movement. In order to minimize frictional resistance to reciprocation of the floor beams, it is contemplated that the guide members be formed, or constructed of a high molecular weight resinous material, sometimes referred to in the trade as UHMW material. Such materials, which are available from several manufacturers, are strong, easily formed to a predetermined configuration, and have exceptionally low surface abrasion, which translates into an excellent bearing relationship between adjacent parts, even if the load on a particular floor beam is such that the beam is forced into contact with the guide member, or is unbalanced, creating upward forces on the lower surface 45 of the upper portion of the guide member.

An important feature of the present invention is the use of a novel bearing/seal system, which is perhaps best illustrated in FIG. 5. The essence of this seal arrangement is to prevent, insofar as may be realistically possible, the incursion of particulate materials, including "fines" of 100 mesh or better, into the pocket areas beneath the floor area, as may be observed in FIGS. 2 and 4.

In accordance with this aspect of the invention, intermediate spaced longitudinal guide members, and equidistant therebetween, the present invention provides a bearing/seal member 50. Each such bearing/seal member 50 parallels its adjacent guide members 30, and comprises a base member 52, which is secured to the subfloor support members 27, by means of a fastener 54, of well know construction. The base member supports a seal plate, or cap, 56 on its upper surface 58, which is secured by fasteners 60, which, as illustrated, comprise rivets of a compatible material such as UHMW.

In order to minimize friction and wear, even in the presence of heavy loads, the seal plate is preferably constructed of a material such as UHMW materials as previously described.

It will be observed in FIGS. 2 through 5 that the longitudinally extending side walls 63 of the plank portion 23 of the floor beams terminate in a downwardly extending ear 65, having an end, or termini, 67, which is formed with a small radius so as not to present a sharp edge to the seal plate. As seen in FIG. 5, the end 67 of the ear 65 engages the surface of the seal plate 56. *As shown by FIGS. 2–5, the conveyor slats or beams 21 have upper side portions that project horizontally outwardly from the lower side portions or legs 41. The upper side portions include lower surfaces and ears 65. The ears 65 are depending, longitudinal edge forming portions. They depend below the lower surfaces and include lower edges 67 that contact the seal plate 56 and space the lower surfaces above the bearing/seal surfaces on top of members 56.*

When the floor beam is under load, the end of the ear 67 and the seal plate 56 form an effective and very simple seal against the incursion or migration of particulate material to the subfloor area. Indeed, with time, the end 67 of the ear will form, by continuous reciprocal movement, a groove 70 in the face of the seal plate, which will, with wear, conform closely to the configuration of the end 67. Thus, as the seal plate wears in, the amount of surface area contact between the ear and the seal plate increases with the result that, with such greater surface contact, the seal becomes further enhanced as the ear 65 rides in that groove.

Because the wear is light, relatively speaking, the service period for a seal plate is quite long, much longer than industry expectations, and the maintenance associated with the novel floor of the present invention is coincidently, exceptionally good.

Thus, the pockets, or voids, defined by the bearing/seal members 50, and the guide members 30 remain exceptionally free of particulate material. Moreover, because the seal plate is of a low friction, high density material, it doubles as a bearing member, both supporting the floor beam, and providing the desired seal. Hence, the name bearing/seal.

The present invention further provides a novel system that has the added feature of being essentially self cleaning. Extreme "fines" are sometimes capable of passing the most effective seal, and when the floor is not under load, the seal formed by the present invention is somewhat less effective. In anticipation of at least some passage of particulate, the present invention simplifies the cleaning process, in avoiding the adverse consequences of build up in the pockets beneath the floor by spacing the support members 27. In this manner, any build up will pass beneath the subfloor, avoiding build up of material and consequent back pressure on the floor beams.

Having thus discussed a preferred embodiment of the present invention, what is claimed is:

1. A [walking] *reciprocating* floor system for use in moving a load, which includes bulk particulate materials [or the like,] disposed in a designated area[;], *comprising:* a plurality of floor beams, said floor beams *being* adapted for supporting particulate *materials* thereon, and moving said load to an unloaded position, each said floor beam terminating in opposed vertically disposed side walls, said floor beams being disposed in side by side relation, and *each* being reciprocal along a longitudinal axis;

a subfloor, said subfloor comprising a series of support members for supporting said floor beams for reciprocal movement relative thereto;

guide means for guiding the movement of *each* said floor [beams] *beam* along a predetermined path, *each* said guide means being secured to *one* said support [members] *member*, each said floor beam *further* having a pair of depending opposed [L shaped] *L-shaped* members, said [L shaped] *L-shaped* members being disposed about one of said guide means for controlled directional movement there along *when the floor beams reciprocate; and* means defining a bearing/seal, said bearing/seal being mounted to said subfloor, and contacting the vertically disposed [sidewalls] *side walls* of said floor beams to provide bearing support therefor, and to thereby serve as a seal against [the] inadvertent passage of *the* particulate material disposed on the [walking] floor *beams* from [its] *a* position on the floor *beams* to a place [there beneath] *therebeneath*.

2. The [novel] apparatus of claim 1, wherein said bearing/seal is secured to said support members in a position between adjacent *said* guide means.

3. The [novel] apparatus of claim 2, wherein each said bearing/seal includes a base member, said base member having a flat seal plate thereon, *each* said [seal plate] *side wall of said floor beams* terminating in a downwardly extending ear being so positioned relative to said floor beams that said ears [contact] *contacts* said seal plate in *a* bearing and sealing relation.

4. The [novel] apparatus of claim 1, wherein each of said floor beams *further* has a flat, upwardly facing support surface thereon, [each of] said flat [supporting] *support* surfaces of *said* floor beams together defining a floor for supporting particulate *material* thereon.

5. The [novel]apparatus of claim 1, wherein said support members are aligned transversely to said floor beams.

6. The [novel] apparatus of claim 5, wherein said support members are spaced apart from one another.

7. The [novel] apparatus of claim 1, wherein said bearing/seal comprises a base member, said base member being secured to said subfloor, and a seal plate, said seal plate being fitted to [the] *an* upper end of said base member so as to be in sealing and bearing contact with said side walls of [an aligned] *a said* floor beam.

8. The [novel] apparatus of claim 1, wherein each said side wall of said floor beams is formed with a depending ear, said ear being in bearing contact with said bearing/seal.

9. The [novel] apparatus of claim 3, wherein *each* said ear forms a groove in said seal plate as said floor beams reciprocate, said [groove] *ear having surfaces and said ear surfaces* creating *groove* surfaces that match the surfaces of said ear, increasing the surface contact therebetween to thereby enhance the sealing and bearing [relationship] *relation* therebetween.

10. The [novel] apparatus of claim 7, wherein said seal plate is formed of a high molecular weight resinous material.

11. A [walking] *reciprocating* floor system for use in a moving bulk particulate materials [or the like,] disposed in a designated area[;], *comprising*:

a plurality of floor beams, each of said floor beams having a flat, essentially horizontally disposed upper surface, said floor beams *being* adapted for supporting and moving particulate *material* placed thereon, each said floor beam terminating in opposed vertically disposed side walls, said floor beams being disposed in side by side relation, and *each* being reciprocal along a longitudinal axis;

a subfloor, said subfloor comprising a series of support members, said support members being disposed transverse to the longitudinal axes of said floor beams, and positioned for supporting said floor beams for reciprocal movement relative thereto;

guide means for guiding the movement of *each* said floor [beams] *beam* along a predetermined path, *each* said guide means being secured to *one* said support [members] *member*, each said floor beam *further* having a pair of depending opposed [L shaped] *L-shaped* members, said [L shaped] *L-shaped* members being disposed about *an associated* one of said guide means for controlled directional movement there along *when the floor beams reciprocate; and* means defining a bearing/seal, said bearing/seal being mounted to said subfloor on opposite sides of an associated guide means, and contacting the vertically disposed side walls of said floor beams to provide bearing support therefor, and to thereby serve as a seal against [the] inadvertent passage of particulate material disposed on the [walking] *reciprocating* floor *conveyor* from its position on the [floor] *conveyor* to a place [there beneath] *therebeneath*.

12. The [novel] apparatus of claim 11, wherein said bearing/seal comprises a base member, said base member being secured to said subfloor, and a seal plate, said seal plate being fitted to [the] *an* upper end of said base member so as to be in sealing and bearing contact with said side walls of [an aligned floor beam] *floor beams above the seal plate*.

13. The [novel] apparatus of claim 11, wherein each said side wall of *each* said floor [beams] *beam* is formed with a depending ear, said ear being in bearing contact with *a* said bearing/seal.

14. The [novel] apparatus of claim 13, wherein *each* said ear forms a groove in *its* said seal plate as said floor beams reciprocate, said [groove] *ear* creating *groove* surfaces that match the surfaces of said ear, increasing [the] surface contact therebetween to thereby enhance [the] *a* sealing and bearing relationship therebetween.

15. The [novel] apparatus of claim 12, wherein each said side wall of *each* said floor [beams] *beam* is formed with a depending ear, said ear being in bearing contact with *a* said bearing/seal.

16. The [novel] apparatus of claim 15, wherein *each* said ear forms a groove in *its* said seal plate as said floor beams reciprocate, said [groove] *ear* creating *groove* surfaces that match [the] surfaces of said ear, increasing [the] surface contact therebetween to thereby enhance [the] *a* sealing and bearing relationship therebetween.

17. The [novel] apparatus of claim 12, wherein said seal plate is formed of a high molecular weight resinous material.

*18. A reciprocating slat conveyor for conveying a load that includes particulate material, said conveyor comprising:*

*a plurality of side-by-side conveyor slats that are movable longitudinally in a first direction, for conveying the load, and are retracted longitudinally in the opposite direction;*

*each said conveyor slat having a load engaging upper region including a pair of substantially horizontal, upper side portions, each with a lower surface and a longitudinal edge-forming portion, depending below said lower surface and including a lower edge;*

*a base structure including a plurality of longitudinal guide members, one for each said conveyor slat, and a plurality of longitudinal slat support members, one for each pair of adjacent upper side portions of said conveyor slats;*

*each said slat support member being positioned below an adjacent pair of said slat upper side portions and including an upwardly directed, hard plastic bearing/seal surface; and*

*each said lower edge contacting and sliding along a said upwardly directed bearing/seal surface that is below said lower edge,*

*wherein by this contacting, each lower edge and the bearing/seal surface below it seals against passage of said particulate material from a region above the conveyor slats to a region below the conveyor slats, and weight of the conveyor slats and the load on the conveyor slats is transmitted downwardly from the conveyor slats onto the slat support members.*

*19. The conveyor of claim 18, wherein each said lower edge forms a groove in the bearing/seal surface on which the lower edge slides, as its conveyor slat reciprocates, said lower edge creating surfaces that match the surfaces of said lower edge, increasing surface contact therebetween to thereby enhance a sealing and bearing relationship therebetween.*

*20. The conveyor of claim 18, further including an open material avenue extending laterally from each said lower edge, across the bearing/seal surface on which the one lower edge is supported, to an open space that is laterally between the slat support member on which the one bearing/seal surface is situated and the conveyor slat that includes one said lower edge.*

* * * * *